United States Patent [19]

Hafele

[11] 4,313,905
[45] Feb. 2, 1982

[54] BLOW MOLDING METHOD

[76] Inventor: Robert X. Hafele, 5836 Vicksburg Dr., Baton Rouge, La. 70816

[21] Appl. No.: 97,229

[22] Filed: Nov. 26, 1979

[51] Int. Cl.³ .............................................. B29C 17/07
[52] U.S. Cl. .................................... 264/532; 264/535; 264/538; 425/526; 425/533; 425/534
[58] Field of Search ............ 264/535, 537, 538, 328.8, 264/328.11, 328.14, 328.16, 532; 425/526, 533, 534

[56] References Cited

U.S. PATENT DOCUMENTS

| | | | |
|---|---|---|---|
| 3,882,213 | 5/1975 | Uhlig | 264/97 |
| 4,050,887 | 9/1977 | Berggren et al. | 264/535 X |
| 4,102,626 | 7/1978 | Scharrenbroich | 425/526 |
| 4,115,494 | 9/1978 | Valyi | 264/89 |
| 4,116,606 | 9/1978 | Valyi | 425/526 |
| 4,117,050 | 9/1978 | Appel et al. | 264/535 X |
| 4,136,146 | 1/1979 | Ninneman | 425/537 X |
| 4,140,464 | 2/1979 | Spurr et al. | 264/537 X |
| 4,151,247 | 4/1979 | Hafele | 425/534 X |
| 4,174,934 | 11/1979 | Valyi | 425/526 X |
| 4,197,073 | 4/1980 | Rees et al. | 264/537 X |
| 4,209,290 | 6/1980 | Rees et al. | 425/534 X |

Primary Examiner—Jan H. Silbaugh
Attorney, Agent, or Firm—Arnold, White & Durkee

[57] ABSTRACT

A method and apparatus are disclosed for forming thermoplastic articles in which preforms are injection molded interiorly of mold cavities around substantially cylindrical core pins on a rotatable turret. The turret is then indexed to displace the core pins to a second position and the preforms are retained on the core pins during indexing and thereafter to cool the preforms to a self sustaining condition. To enhance cooling, the preforms may be engaged by temperature conditioning molds while on the core pins. After adequate cooling, the preforms are removed from the core pins and positioned on carrier sleeves. The preforms are then thermally conditioned on the carrier sleeves to a predetermined temperature, following which they are blow molded in blow mold cavities.

13 Claims, 6 Drawing Figures

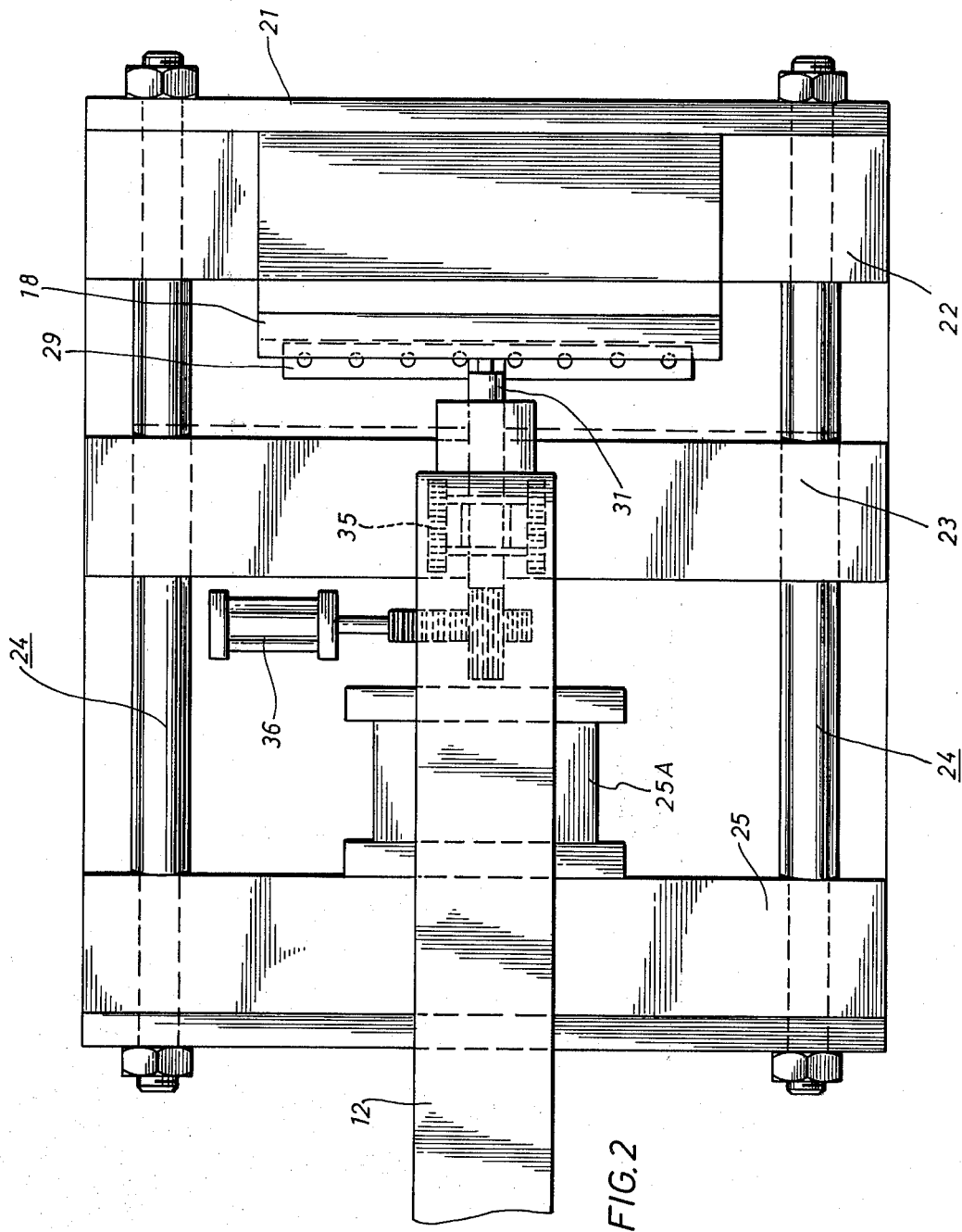

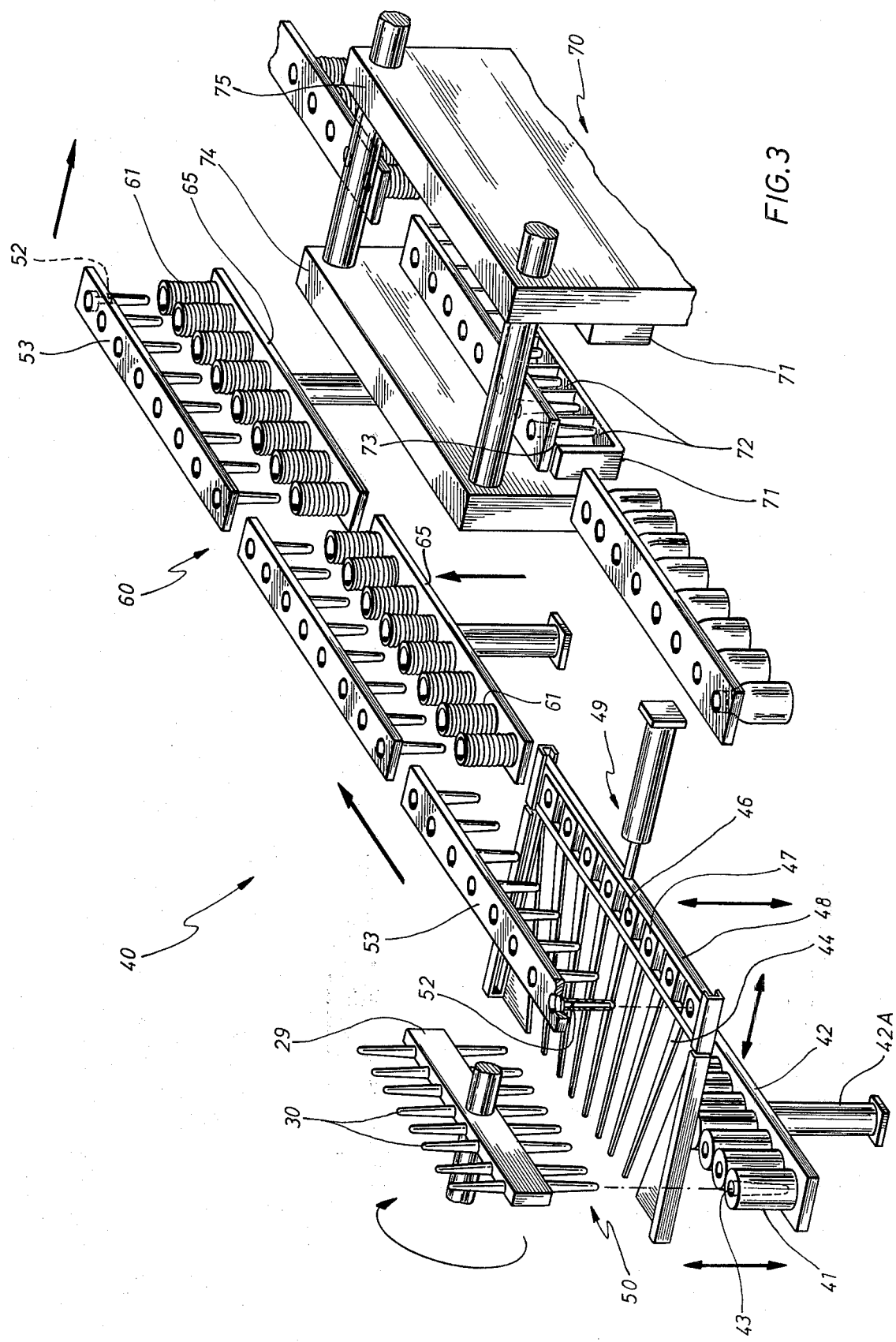

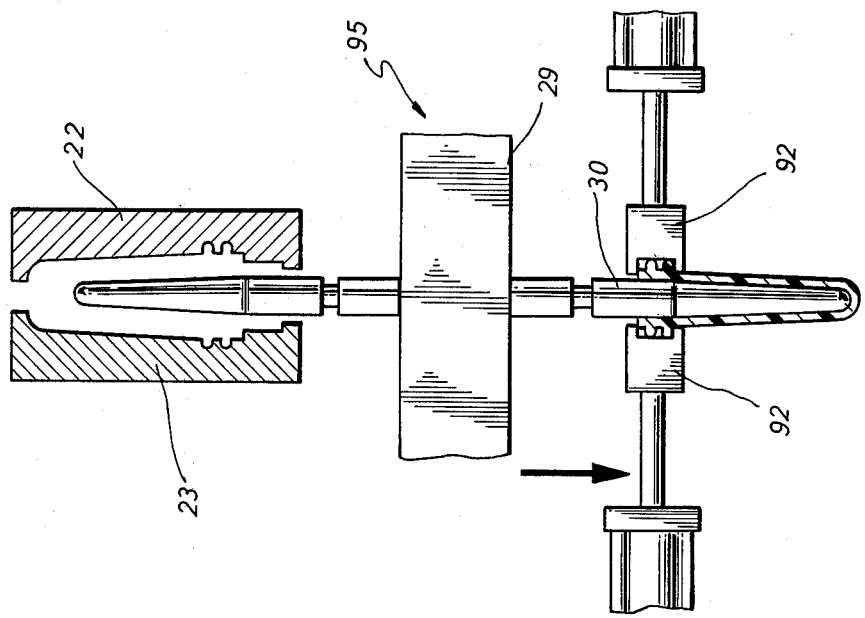
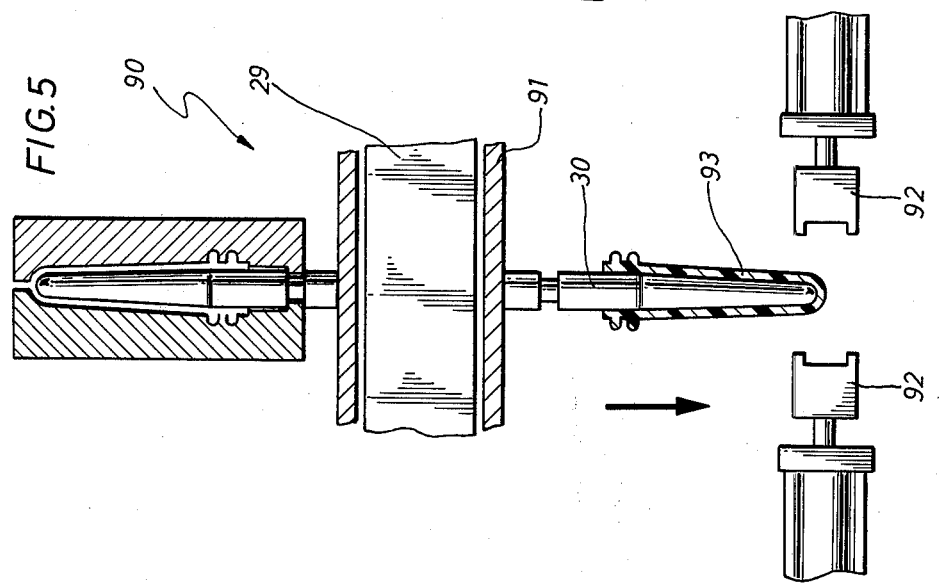
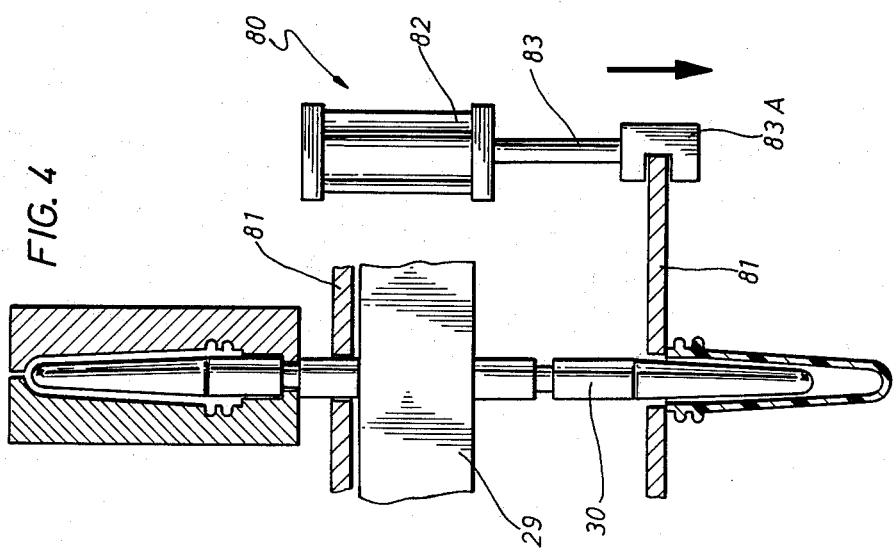

BLOW MOLDING METHOD

BACKGROUND OF THE INVENTION

This invention relates generally to a blow molding method and apparatus and more particularly, it concerns an improved blow molding apparatus system for successively forming a plurality of thermoplastic articles.

Many devices have been proposed for the continuous forming of thermoplastic articles. These devices include such features as a turret having a vertical axis in order to enable the selective indexing of a plurality of sets of core pins into an injection mold. Such a feature enables the continuous forming of thermoplastic preforms between the core pins and the mold cavities of the injection mold.

While this feature facilitates the successive formation of preforms on core pins it does not directly address the problem of maximizing the number of preforms which might be formed on a given iteration or within a given time span. It also does not address the problem of cooling the preform sufficiently and within a minimum time frame such that the removal of the preforms may be accommodated without substantial deformation of the preform.

Previous blow molding apparatus have also included a preform mold which has a unibody construction into which the core pin is inserted and the preform is injection molded. This feature is undesirable because of the time period necessary for the preform to cool before removing the core pin and preform and because of the increased wall friction and suction created by the unibody construction upon removal of the core pin.

Additionally, once removed from the mold cavity, the preform has been allowed in the past to cool on the core pin or has been removed from the core pin and placed on a conveyor to be cooled. Oftentimes, when these alternatives are utilized, irregularities in the wall thickness greatly lengthen the amount of time necessary for complete cooling in that the time necessary for the cooling of the preform given such regularities is the time necessary for the maximum thickness to adequately cool.

Still other apparatus require several steps for the removal of the preform from the core pin, for the conveying of the preform through thermal conditioning, and for the spacing of the preform preparatory to blow molding. These additional steps require extra time and extra machinery, thereby increasing the cost of production per article.

Accordingly, in order to provide an improved blow molding apparatus, it is desirable to provide an apparatus which minimizes the cooling time of the peform on the core pin prior to its removal. The apparatus should maximize the number of preforms manufactured for each iteration while minimizing the cost and size of the machinery. Additionally, the device should maximize the efficiency with which the preforms are handled from removal to blow molding in order to minimize the time per unit and maximize the production thereby.

SUMMARY OF THE INVENTION

The present invention overcomes prior art disadvantages through an apparatus and method of injection molding a plurality of preforms, heat treating those preforms, and blow molding the preforms at a predetermined blowable temperature preferably a temperature conducive to molecular orientation.

In a preferred embodiment of the present invention, an apparatus is provided for forming a plurality of thermoplastic articles, the apparatus including a base and an injection molding machine mounted to the base. An injection nozzle system is secured to the molding machine and in communication with the machine having a runner system and a plurality of injection nozzles. A pair of opposing mold platens is movably secured to the base beneath the runner system. The mold platens have opposing cavities wherein the opening and closing of the platens opens and closes the cavities. A turret is further movably secured to the base such that rotational and linear movement of the turret in relation to the mold platens is accommodated. The turret includes a plurality of core pin sets secured to it such that the seccessive rotational movement of the turret displaces the successive sets of core pins into the mold cavities for injecting a plurality of preforms around the core pins and then dsiplaces them successively out of the mold cavities.

Means for stripping the preform from the core pins after having been injection molded and cooled are also included. A rack having a first and second end is secured to the base adjacent to such stripping means for receiving the preforms when stripped. The rack incudes a plurality of tines which converge toward the first end and a plurality of carrier blocks slidably mounted between the tines such that movement of the blocks from the first end to the second end laterally displaces and spaces the carrier blocks. The carrier blocks, in turn, have respective apertures having an inner dimension adequate to support a preform once it is stripped.

A carrier sleeve conveyor is additionally positioned in alignment with the second end of the rack, the conveyor having a plurality of sets of a plurality of carrier sleeves secured thereto. The carrier sleeves are spaced such that they align with the apertures in the carrier blocks when in opposition to the blocks at the second end of the rack and have a configuration such that they may be force fit into the preforms in order to pendently support and carry the preforms from the rack to the blow molding stage.

A pair of opposing blow mold halves are also included in communication with the carrier sleeve conveyor. Each blow mold half has a plurality of opposing blow mold cavities with a space substantially equal to the spacing of the carrier sleeves on each set of carrier sleeves such that the conveying of the carrier sleeve into the blow mold halves accommodates the closing of the blow mold halves upon the sleeves and the preforms thereby.

In a more preferred aspect of the present invention, the apparatus further comprises a plurality of temperature conditioning molds movably secured to the base such that movement of the molds displaces the molds over the core pins to engage the preforms prior to their removal from the core pins, in order to thermally condition the preforms prior to their removal from the core pins. Additionally, these molds may provide a compression molding function.

In the most preferred aspect of the present invention, the apparatus further comprises a plurality of cylindrical heaters movably mounted to the base and in alignment with the carrier sleeve conveyor such that movement of the heaters displaces the heaters over a set of carrier sleeves for thermally conditioning the preforms.

The instant invention additionally provides a method for preforming a plurality of thermoplastic articles. This is accomplished by injection molding a plurality of essentially tubular thermoplastic preforms at a first position interiorly of a plurality of mold cavities around a plurality of substantially cylindrical core pins mounted on a rotatable turret. The turret is then indexed to displace the core pins from the first position to a second position. During the indexing step, the preforms are retained on the core pins and cooled to an essentially self-sustaining condition. To enhance this cooling, the core pins may be engaged by a thermally conditioned mold in order to both speed cooling and to potentially compression mold the material to create a uniform wall thickness.

The preforms are then removed from the core pins and positioned on a plurality of respective carrier sleeves. While on the carrier sleeves, the preforms are carried through a thermal conditioning region wherein the preforms are heated to a selected temperature, preferably one that is conducive to molecular orientation. Upon reaching the desired temperature, the preforms are blow molded within a plurality of blow mold cavities.

In another aspect of the present method, the preforms may be tempered while on the core pins during the indexing from the first position to the second position and, thereafter, while in the second position.

In an additional aspect of the present method, the preforms are positioned in a plurality of carrier blocks upon removal from the core pins. The carrier blocks are then displaced to space the preforms preparatory to blow molding. Carrier sleeves are telescoped into the preforms in order to force fit the preforms on the sleeves such that the preforms are pendently supported by the carrier sleeves upon the lifting of the carrier sleeves from the carrier blocks.

In an additional aspect of the method of the present invention, a heater may be placed around each preform during the thermal conditioning of the preforms in order to heat the preforms to a predetermined temperature preparatory to blow molding.

In another aspect of the present method, the preforms are removed from the core pins by means of a stripper plate positioned between the turret and the core pins. The stripper plate is moved outwardly from the turret toward the end of the core pins to strip the preforms from the core pins.

Further, to coordinate the removal of the preforms from the core pins and the spacing of the preforms preparatory to blow molding, the core pins may be vertically oriented and positioned over a plurality of carrier blocks having apertures of sufficient dimension to receive the preforms. The preforms are then stripped downwardly, thereby causing them to be gravity fed into the apertures. The blocks may then be laterally displaced and carrier sleeves may be inserted as described above.

In an alternative aspect of the present invention, the core pins may be mounted on a plate movably secured to the turret. The core pins are then removed by moving the plate outwardly from the turret, gripping the preforms with the plurality of grippers, and then retracting the plate while holding the grippers substantially stationary such that the preforms are removed from the core pins.

In an alternative aspect of the present invention, the turret may be lowered to accommodate the gripping of the preforms by a plurality of grippers. The turret is then raised with the core pins such that the preforms are held in the grippers and are removed from the core pins.

In a preferred aspect of the method of the present invention, the preforms are blow molded by displacing the preforms and carrier sleeves into a position between halves of a multicavity blow mold assembly. The mold halves are then closed around the preforms and a blow pin is inserted into the tubular carrier sleeve. Air is injected under pressure through the blow pins into the interior of the preform to form the final article. This method may be further characterized by displacing a rod through the blow pin to guide and stretch the preforms during the blow molding operation.

In the most preferred method of the present invention, a plurality of thermoplastic preforms are injection molded around a first set of generally axially aligned core pins at a first station in an injection cavity formed by injection mold sections closed around the core pins. The injection mold sections are opened after the molded preforms are formed and cooled sufficiently to be transported on the core pins. The preforms are then transported from the first station and cooled by heat transfer to the core pins. During the transportation of the first set of core pins, a second set of core pins are transported to the first station so that the injection mold sections may be closed around those core pins for the formation of the subsequent set of molded preforms. The first set of molded preforms on the first set of core pins are then downwardly displaced off the core pins to a set of transporting blocks where the preforms are pendently supported. These preforms are then displaced from the second station at the same time that the second set of core pins is displaced from the first station to the second station. These steps are successively repeated in a continuous operational cycle to form successive sets of generally axially aligned preforms and to transfer those preforms to the transporting blocks.

Once the preforms are in the transporting blocks, the transporting blocks are laterally displaced to achieve relative displacement of the blocks and to space the preforms a greater distance from each other in preparation for the blow molding step. Each successive set of preforms is then passed through a thermal conditioning region, subsequent to which each set of preforms is blow molded.

In a preferred aspect of this method, each successive set of preforms may be force fit upon a plurality of sets of a plurality of carrier sleeves while in the transporting blocks, and then may be displaced for the thermal conditioning region.

In an additional aspect of this method, the preforms may be further cooled in a plurality of temperature conditioning molds having dimensions slightly greater than the preform, and may be compression molded to some extent in those molds.

Accordingly, the present invention provides a system for continuously forming blown articles from injection molded preforms and overcomes the previously discussed problems with excessive cooling time by minimizing the cooling time of the preform on the core pin and increasing the efficiency of the preform conveying system from the turret to the blow mold station. The invention also enables the use of smaller injection mold platens, since the preforms are laterally spaced prior to the blow molding step. Use of the compression molding step may also enhance uniform wall thickness, thereby lessening cooling time over preforms having nonuniform thicknesses of comparable dimension.

BRIEF DESCRIPTION OF THE DRAWINGS

This invention will be further illustrated by reference to the appended drawings which illustrate a particular embodiment of the device for blow molding a plurality of thermoplastic articles in accordance with this invention.

FIG. 2 is a top view of the machine illustrated in FIG. 1.

FIG. 3 is a schematic view of the blow molding system illustrating the system between the injection molding machine and the end of the process.

FIG. 4 is a side view of one alternative embodiment for stripping the preform from the core pin.

FIG. 5 is a view similar to FIG. 4, but illustrating an alternative embodiment of the preform removal system.

FIG. 6 is a side view similar to FIG. 4, but illustrating another alternative embodiment of the preform removal means.

DESCRIPTION OF THE PREFERRED EMBODIMENTS

Figure 1:
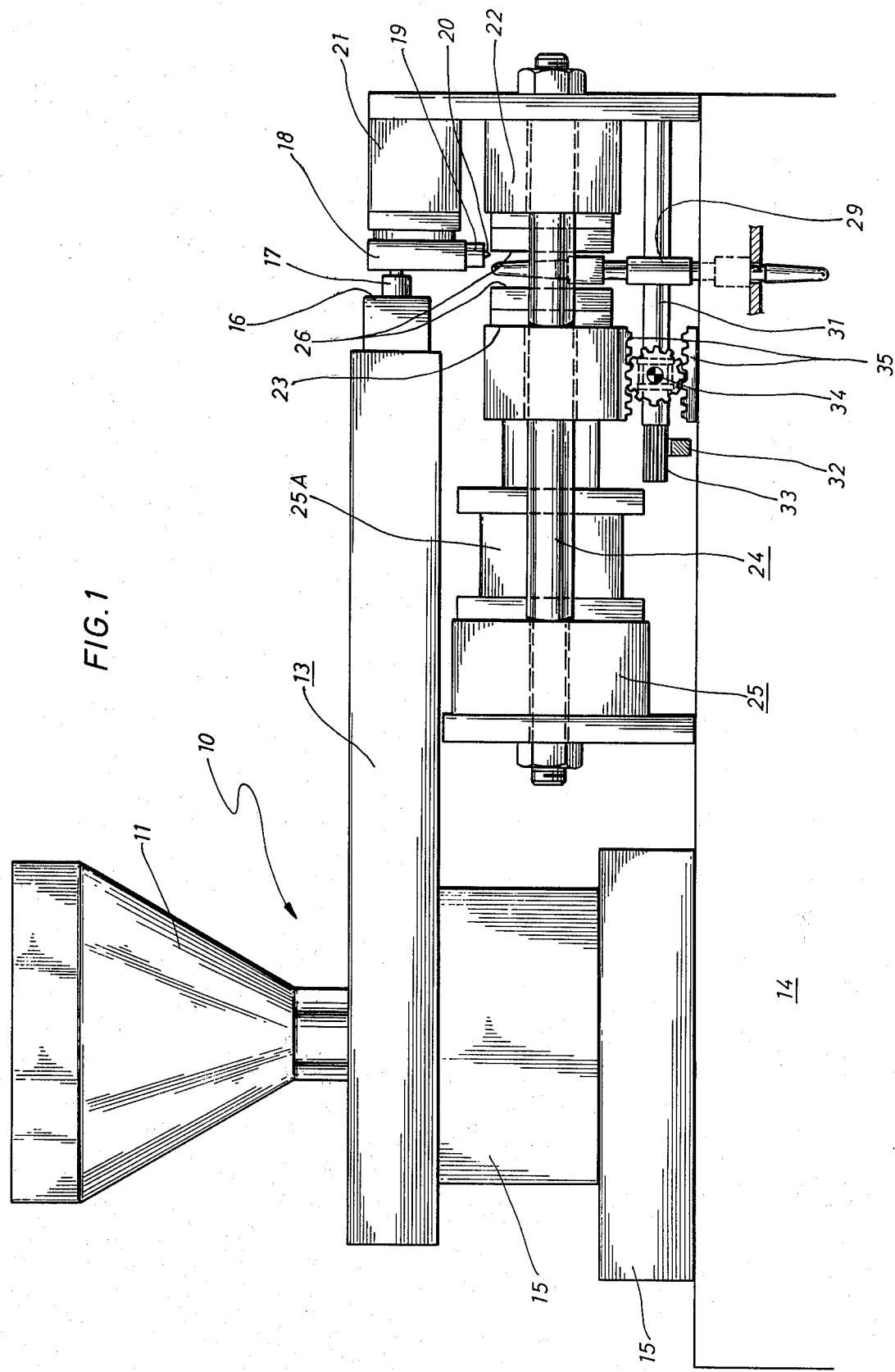
FIG. 1 is a side view of the injection molding machine illustrating the location of the turret and mold platen with respect to the machine.

The preferred embodiment is generally represented by an injection molding system 10, a conveying and thermal conditioning system 40 and a blow molding system 70.

Referring to FIG. 1, the injection molding system 10 is comprised of a hopper 11 in communication with an injection molding machine 13 for supplying thermoplastic or other similar material. The hopper 11 and injection molding machine 13 are secured to a base 14 and may include suitable spacing supports 15. The injection molding machine 13 has an injection aperture 16 to which is secured an injection nozzle 17. Secured to and in communication with the injection nozzle 17 is a runner system 18 comprising a plurality of injection points 19, each having a mold injection aperture 20.

A runner system support 21 is secured to base 14, as shown, to support the runner system in position over a pair of mold sections, as more fully described below.

As will be understood by those skilled in the art, the hopper, injection molding machine, base, injection nozzle and runner system may be comprised of any one of a number of suitable such systems presently available in the market for injection molding a preform.

The injection molding system 10 further includes a first mold platen half 22 secured to the runner system support 21. A second mold platen half 23 is movably secured to base 14 by means of guide rods 24 and guide rod support 25 in order to provide linear displacement means for the second mold platen half. The first and second mold platen halves 22 and 23 further have mold cavities 26 on their opposing sides positioned such that upon the linear displacement of the second opposing mold platen half 23 into contact with the first mold platen half 22, a plurality of mold cavities will be formed respectively beneath the injection points 19 on the runner system 18. The mold platen should further have a plurality of upper apertures and lower apertures when combined, the upper apertures corresponding with the injection points 19 and the mold cavities 26 to accommodate the ingress of material from the injection molding machine into the mold cavities 26. The lower apertures, in turn, should have a configuration and position such that they accommodate the entry of a core pin into the mold cavity and such that they snuggly fit the core pin once it is in position in order to prevent the egress of material upon injection molding.

The injection molding system 10 further includes a means to index a plurality of sets core pins successively into and out of the mold platens 22 and 23 in order to form successive sets of preforms. These means may include a core pin turret 29 comprising a plurality of sets of substantially cylindrical core pins 30. The core pin turret 29 is movably secured to the base 14 such that both rotational motion and longitudinal linear motion are provided. The rotational movement may be provided by means of a rack 32 and a core pin shaft pinion gear 33 secured in combination to a core pin turret shaft 31 such that movement of the rack 32 rotates pinion gear 33, thereby rotating the turret shaft 31 and the turret 29.

The lateral movement of the turret 29, in turn, may be provided by a linear motion pinion 34 secured to the core pin turret shaft 31 and in communication with a linear motion rack 35 having upper and lower sides such that the upper side is secured to the second opposing mold platen half 23 and the lower side is secured to the base 14. Therefore, movement of the second opposing mold platen half 23 causes linear movement of the core pin turret 29 to accommodate the proper placement of the core pin turret within the mold platen halves upon the closing and opening of the mold platen halves 22 and 23.

In the preferred embodiment, the turret 29 includes two opposing sets of core pins 30, but this number could be increased as desired so that the preforms could be retained on the core pins during indexing for thermal conditioning. The number of core pins 30 in each set is dictated by width limitations on the mold platens. These core pins should preferably include internal conduits (not shown) as is typical in the art to accommodate the circulation of cooling fluid to facilitate the setting of the thermoplastic material.

Means to move the rotational rack 32 and to move the second opposing mold platen half 23 should further be provided. These means may include a hydraulic cylinder 36 (shown in FIG. 2) for the rotational rack and another hydraulic cylinder 25A for the mold platen half 23. As will be understood by those skilled in the art, these hydraulic cylinders may be comprised of any of a number of suitable cylinders available in the art.

Accordingly, as shown in FIGS. 1 and 2, the movement of the second opposing mold platen 23 into contact with the first mold platen 22 will correspondingly displace the turret 29 into position between the platen halves 22 and 23 for the injection molding step. Likewise, the opening of the platen halves 22 and 23 will simultaneously withdraw the turret 29 from close proximity to the first mold platen half 22 in order to accommodate the rotation of the turret 29 into a second position.

Referring now to FIG. 3, there is schematically shown a conveying the thermal conditioning system 40 in accordance with the present invention. The conveying and thermal conditioning system 40 may include a plurality of temperature conditioning molds 41 secured to a mold support stand 42. The molds 41 each include a recess bore 43 having an inner configuration and dimension substantially equal to the outer configuration of a preform after injection molding. These optional molds may be used to facilitate the cooling of the preforms and also to assure uniform preform wall thickness, by compression molding. The mold support 42 should be movably secured to the base 14 such that movement of the support 42 and the molds 41 over the core pins 30 is accommodated. The means for moving the support 42 may include a hydraulic cylinder 42A or other suitable mechanisms such as are understood by those of skill in the prior art.

The molds 41 may further comprise conventional temperature control means in order that the inner temperature of these molds may be maintained at a temperature conducive to the cooling of the pre-forms and their proper tempering thereby.

The conveying and thermo-conditioning system 40 further comprises a plurality of carrier blocks 47 slidably mounted in a carrier block rack 48. Lateral movement of the carrier blocks may be effected by a hydraulic ram, shown by reference numeral 49. The carrier block rack 48 is comprised of a plurality of converging tines 44 regularly spaced such that movement of the carrier blocks 47 between the tines 44 converges the blocks 47 at the end of the rack underneath the core pins and laterally displaces them at the other. The spacing of the carrier blocks 47 at the converged end corresponds substantially with the spacing of the core pins 30 on the core pin turret 29 such that the removal of preforms from the core pins 30 causes the preforms to fall into substantial alignment with the carrier block apertures 46. The rack 48 and its associated components are also vertically moveable, as indicated, by any suitable power means and guide system (not shown) in order to place the preforms on carriers sleeves.

A plurality of carrier sleeves 52 are secured to several laterally displaceable carrier sleeve supports 53. The carrier sleeves 52 have a downward vertical orientation and are spaced such that the carrier sleeves 52 substantially align with the carrier block apertures 46 in the carrier blocks 47 when the blocks are at the non-converged end of the carrier block rack 48. The carrier sleeves 52 further have a tapering configuration such that they may be telescoped into the neck of the pre-forms while in the carrier block aperture 46 and force fit into the preform to pendently support the preform through the rest of the process. This configuration may take the form of a frustum of a cone tapering from a diameter less than the inner diameter of the preform to a larger outer diameter at the base of the sleeve.

The carrier sleeve supports 53 may be indexed from the position over the rack 48, then through a thermal conditioning region, then into position between blow mold halves, then into a stripping position and back to a position over the rack by a suitably shaped guide system (not shown). Movement on such a guide system may be effected, for example, by conveyor belts, hydraulically operated piston rods, or any other suitable motive means.

The conveying and thermal conditioning system 40 further includes a thermal conditioning region 60 for conditioning the preforms to a blowable temperature, such as one that is conducive to molecular orientation. This region 60 may include a plurality of stations 65 comprising a plurality of hollow cylindrical heaters 61. The stations may be displaced vertically in relation to the carrier sleeves 52 and have a spacing corresponding to a spacing of the carrier sleeves such that vertical movement of the station 65 accommodates the surrounding of the respective carrier sleeves 52 and preforms by the respective heaters 61.

The blow molding station 70 comprises opposing blow mold halves 71 having a plurality of cavities 72. The cavities 72 have a configuration substantially equivalent to the desired configuration for the finished product and include an upper aperture 73 having dimensions approximate the outer dimensions of the top of the pre-form and carrier sleeve 52 such that the closing of the blow mold halves around he preforms on the carrier sleeves is accommodated. The blow mold halves 71 are, in turn, secured to a movable blow mold supports 74 and 75 such that the movement of these supports causes the blow mold halves to properly align and close together. As will be understood by those skilled in the art, supporting and moving the blow mold supports 74 and 75 may be done by any of a number of suitable apparatus well-known in the art.

The blow mold station 70 further comprises a plurality of blow pins (not shown) having a spacing corresponding substantially to the spacing of the carrier sleeves 52. The blow pins may then be lowered into each carrier sleeve in order to accommodate the blow molding of the preform. The blow pin may further comprise a rod (not shown) extending through its center. The rod may then be extended to guide and stretch the preforms during the blow molding operation. Both these features are known in the art and may be of any conventional design.

Referring to FIGS. 4–6, there are shown alternative embodiments for removing the pre-form from the core pin in preparation for thermal conditioning. Referring to FIG. 4, the core pin stripper 80 comprises a stripper plate 81 positioned at the base of the core pin 30 adjacent to the core pin turret 29. Means for moving the core pin stripper plate 81 in order to strip the preform form the core pin should be included. In the preferred embodiment, these means include a hydraulic cylinder 82, a piston rod 83 and a channel-shaped engagement member 83A. In operation, the rotation of the turret places a portion of plate 81 within the engagement member 83A. Movement of the cylinder piston 83 forces the core pin stripper plate 81 outwardly to strip the preform from the core pin. The stripper plate may further extend along the length of a set of core pins and have a plurality of apertures corresponding to each core pin such that movement of one stripper plate 81 removes an entire set of preforms from a set of core pins.

Referring to FIG. 5, the core pin stripper 90 comprises a core pin support plate 91 which is movably secured to the core pin turret 29. The core pins 30 are fixedly secured to the core pins support plate 91 such that movement of the plate causes corresponding movement of the core pins. The core pin stripper 90 further comprises a plurality of pairs of opposing grippers 92, the grippers being movably secured to the base such that movement of the grippers causes them to converge upon the core pin when extended down between them.

In operation of the core pin stripper depicted in FIG. 5, the core pin support 91 is first displaced downwardly such that the top of the preform aligns substantially with the grippers 92. The grippers are then converged upon the top of the preform such that the preform is held between them. The vertical displacement of the core pin support plate 91 upwardly back to the turret then removes the core pin from the preform leaving the preform 93 secured between the grippers.

Referring to FIG. 6, a core pin stripper 95 is illustrated comprising preform grippers 92 and movable turret 29. In this embodiment, the turret is movably secured to the base to allow for vertical movement as well as the above-mentioned linear and rotational movement. The turret 29 is then moved downwardly until the preform is aligned between the grippers and the grippers are closed upon the preform to secure the preform between them. The restoration of the turret 29 to its original position then removes the core pins from preforms.

In operation, and referring back to FIGS. 1 and 2, the core pin turret 29 is indexed such that a set of a plurality of core pins 30 is positioned between the first mold platen half 22 and second mold platen half 23. The platen halves are closed upon the core pins and a plurality of essentially tubular thermoplastic preforms are injection molded at this first position interiorly of the plurality of mold cavities 26 around the plurality of substantially cylindrical core pins 30. After the mold halves are opened, the turret 29 is then indexed to displace the core pins 30 from the first position between the mold platen halves to a second position. The preforms are retained on the core pins during the indexing step and thereafter to cool the preforms to an essentially self-sustaining condition. In the preferred embodiment, the cooling of the preforms is enhanced by engaging the preforms with temperature conditioning molds 41 so that the preforms are uniformly cooled and tempered to a preselected temperature range and condition. The molds 41 may also optionally perform a compression molding function. After displacing molds 41 downwardly, the preforms are then removed, utilizing a stripper plate as shown in FIG. 4 such that the preforms drop into the carrier block apertures 46 in the carrier blocks 47 at the converged end of the carrier rack 48. The carrier blocks 47 are then displaced to the other end of the carrier rack 48 thereby laterally displacing and spacing the preforms preparatory to blow molding.

The carrier rack 48 is then raised upwardly toward an aligned carrier sleeve support 53 to force fit the preforms onto the carrier sleeves 52 and pendently support the preforms thereby. The set of carrier sleeves is then moved intermittently through successive thermal conditioning stations 65 in the thermal conditioning region until a temperature, preferably conducive to molecular orientation, is achieved. Upon the achievement of this condition, the carrier sleeves 52 and preforms are then moved into position between the blow mold cavity halves, at which time the halves 71 are closed to form a plurality of blow mold cavities 72. Blow pins are inserted into the carrier sleeves, the pins having rods through their center; and air is injected into the preforms to blow mold the pre-forms substantially to the shape of their respective blow mold cavity, and preferably to achieve biaxial orientation of the material. The carrier support is then moved to a stripping station to remove the blown articles and then indexed back to receive a subsequent set of preforms from the carrier rack.

This sequence of injection molding a set of preforms, indexing them to a second position wherein they are optionally cooled by a separate set of molds, removing the preforms into carrier blocks, fitting the preforms onto carrier sleeves, and then transporting successive sets of carrier sleeves through a thermal conditioning region to blow molding may be successively repeated either for a given number of iterations or until a predetermined quantity of blow molded objects are formed.

The instant invention has been disclosed in connection with specific embodiments. However, it will be apparent to those skilled in the art that variations for the illustrated embodiments may be undertaken without departing from the spirit and scope of the invention. For example, the individual heaters in a thermal conditioning region could be replaced by successive regions having a constant temperature within a small area. Additionally, three or four sets of core pins could be included on the core pin turret in order to provide intermediate cooling steps for the preforms on the core pins. A further variation would include orienting successive sets of temperature conditioning molds around the core pin turret such that the preforms may be passed through successive tempering stages. This apparatus and method may be used with various types of materials, such as polyethylene terephthalate or polypropylene. It may also be desirable to differentially heat the preforms prior to the blow molding step, in order to accommodate different expansion ratios of the plastic material during blowing. These and other variations will be obvious to those skilled in the art and are within the spirit and scope of the invention.

What is claimed is:

1. In a method of forming a plurality of thermoplastic articles, the steps of:
   (a) injection molding a plurality of essentially tubular, thermoplastic preforms at a first position interiorly of a plurality of mold cavities around a plurality of substantially cylindrical core pins mounted on a rotatable turret, thereby forming preforms having at least one open end;
   (b) indexing the turret to displace the core pins from the first position to a second position;
   (c) retaining the preforms on the core pins during the indexing step to cool the preforms;
   (d) maintaining the inner surfaces of the preforms in contact with the core pins while engaging the outer surface of the preforms with a set of molds having inner dimensions substantially equivalent to the outer dimensions of the preforms, and thereby cooling the preforms to an essentially self-sustaining condition by transferring heat from both the inner and outer surfaces of the preforms respectively to the associated core pins and the set of the molds;
   (e) removing the preforms from the core pins;
   (f) positioning the preforms in carrier blocks substantially aligned with the core pins and displacing the carrier blocks to space the preforms further apart preparatory to blow molding;
   (g) telescopically inserting a plurality of respective carrier sleeves into the preforms as spaced apart by the performance of step (f);
   (h) thermally conditioning the preforms while on the carrier sleeves to a temperature conducive to blow molding; and
   (i) blow molding the preforms within a plurality of blow mold cavities.

2. The method of claim 1, characterized during the performance of step (d) by tempering the preforms.

3. The method of claim 1 characterized during the performance of step (g) by supporting the preforms in a plurality of carrier blocks and inserting the carrier sleeves into the preforms while in the carrier blocks such that the preforms are force fit onto the carrier sleeves.

4. The method of claim 1, characterized during the performance of step (h) by positioning a heater around each individual preform.

5. The method of claim 1, wherein a stripper plate is positioned between the turret and the core pin, characterized during the performance of step (e) by moving the stripper plate in the direction of the end of the core pins to strip the preforms from the core pins.

6. The method of claim 1 wherein a plurality of the core pins are mounted on a plate movably secured to the turret, characterized during the performance of step (e) by moving the plate outwardly away from the turret, next gripping the preforms with a plurality of grippers and then retracting the plate while holding the grippers substantially stationary such that the preforms are removed from the core pin.

7. The method of claim 1, characterized during the performance of step (e) by lowering the turret, gripping the preforms with a plurality of grippers; and then raising the core pins such that the preforms remain in the grippers and are removed from the core pins.

8. The method as defined by claim 1, wherein the carrier sleeves are essentially tubular, characterized in step (i) by displacing the preforms and the carrier sleeves into position between the halves of a multicavity blow mold assembly, closing the mold halves around the preforms, inserting blow pins into the tubular carrier sleeves, and injecting air by the blow pins into the interior of the preforms to form the final articles.

9. The method as defined in claim 8, characterized by further displacing a rod through the blow pin to guide and stretch the preforms during the blow molding operation.

10. In a method of injection molding a plurality of thermoplastic preforms and then blow molding the preforms into a plurality of articles, the steps of:
(a) injection molding a plurality of thermoplastic preforms around a first set of generally axially aligned vertically oriented core pins at a first station in an injection cavity formed by injection mold sections closed around the core pins;
(b) opening the injection mold sections after the molded preforms are formed and cooled sufficiently to be transported on the core pins;
(c) transporting the injection molded preforms on the first set of core pins from the first station and cooling the preforms by heat transfer to the core pins;
(d) during the performance of step (c), transporting a second set of generally axially aligned core pins to the first station so that the injection mold halves may be closed around those core pins for the formation of a subsequent set of molded preforms;
(e) maintaining the inner surfaces of the preforms in contact with the core pins while engaging the outer surfaces of preforms with a set of molds having inner dimensions substantially equivalent to the outer dimensions of the preforms, and thereby cooling the preforms to an essentially self-sustaining condition by transferring heat from both the inner and outer surfaces of the preforms respectively to the associated core pins and the set of molds;
(f) at a second station, after the performance of step (e), downwardly displacing the molded preforms in a vertically oriented position from the first set of core pins to a set of transporting blocks generally vertically aligned with the core pins, and pendantly supporting the preforms with the transporting blocks;
(g) after the performance of step (f), displacing the first set of core pins away from the second station and toward the first station while simultaneously displacing the second set of core pins from the first station preparatory to performance of step (f) with respect to the second set of core pins;
(h) successively repeating the performance of steps (a)-(g) in a continuous operational cycle to form successive sets of generally axially aligned preforms and then transferring each successive set to the transporting blocks;
(i) after the receipt of each successive set of preforms, laterally displacing the transporting blocks from the position in general alignment with the core pins and moving the blocks along the axis of the aligned preforms to space the preforms a greater distance from each other in preparation for a blow molding step; and
(j) blow molding each successive set of preforms interiorly of a set of blow mold cavities to form a plurality of blown plastic articles.

11. The method as defined in claim 10, characterized after the performance of step (i) by telescoping each successive set of preforms onto one set of a plurality of sets of carrier sleeves, and then displacing each successive set of preforms on an associated set of carrier sleeves through a thermal conditioning region.

12. The method as defined in claim 11, characterized by intermitently displacing each set of preforms while suspended on the carrier sleeves, and thermally conditioning the preforms by displacing thermal conditioning means to surround the preforms during at least one of the pauses in the intermitent displacement.

13. The method as defined in claim 12, wherein the carrier sleeves are tubular, characterized in step (j) by closing blow mold sections around the preforms while carried by the carrier sleeves and by injecting air under pressure through the carrier sleeves of expand the preforms to the shape of a blown article.

* * * * *

UNITED STATES PATENT AND TRADEMARK OFFICE
CERTIFICATE OF CORRECTION

PATENT NO. : 4,313,905
DATED : February 2, 1982
INVENTOR(S) : Robert X. Hafele

It is certified that error appears in the above—identified patent and that said Letters Patent is hereby corrected as shown below:

Column 1, line 19, insert a comma (,) after the word pins --.

Column 1, line 55, "peform" should read -- preform --.

Column 2, line 18, "seccesive" should read -- successive --.

Column 2, line 21, "dsiplaces" should read -- displaces --.

Column 6, line 62, "the thermal" should read -- and thermal --.

Column 8, line 38, "form" should read -- from --.

Signed and Sealed this

Twenty-ninth Day of May 1984

[SEAL]

Attest:

GERALD J. MOSSINGHOFF

Attesting Officer

Commissioner of Patents and Trademarks